United States Patent
Higuchi et al.

(10) Patent No.: US 7,973,127 B2
(45) Date of Patent: Jul. 5, 2011

(54) METHOD FOR PRODUCING POLYTETRAFLUOROETHYLENE FINE POWDER

(75) Inventors: Shinya Higuchi, Tokyo (JP); Yasuhiko Matsuoka, Tokyo (JP); Shigeki Kobayashi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/891,867

(22) Filed: Sep. 28, 2010

(65) Prior Publication Data

US 2011/0021728 A1 Jan. 27, 2011

Related U.S. Application Data

(63) Continuation of application No. PCT/JP2009/057460, filed on Apr. 13, 2009.

(30) Foreign Application Priority Data

Apr. 14, 2008 (JP) .................................. 2008-104307

(51) Int. Cl.
*C08G 63/02* (2006.01)
*C08G 63/00* (2006.01)
(52) U.S. Cl. ...... 528/490; 523/201; 524/502; 528/326.2
(58) Field of Classification Search .................. 523/201; 524/502; 528/326.2, 490
See application file for complete search history.

(56) References Cited

U.S. PATENT DOCUMENTS

| 5,756,620 | A | 5/1998 | Aten |
| 6,395,848 | B1 | 5/2002 | Morgan et al. |
| 6,822,060 | B2 | 11/2004 | Kobayashi et al. |
| 2003/0065115 | A1 | 4/2003 | Kobayashi et al. |
| 2005/0150833 | A1* | 7/2005 | Funaki et al. ................. 210/643 |
| 2010/0160490 | A1* | 6/2010 | Leffew et al. ................. 523/201 |
| 2010/0160531 | A1* | 6/2010 | Leffew et al. ................. 524/502 |

FOREIGN PATENT DOCUMENTS

| CA | 2 360 025 A1 | 8/2000 |
| DE | 199 03 657 A1 | 8/2000 |
| EP | 1 661 916 A1 | 5/2006 |
| JP | 48-17546 | 3/1973 |
| JP | 52-43895 | 4/1977 |
| JP | 09-141734 | 6/1997 |
| JP | 09-263611 | 10/1997 |
| JP | 2002-338631 | 11/2002 |
| JP | 2002-356506 | 12/2002 |
| JP | 2003-119204 | 4/2003 |
| WO | WO 2007/119829 A1 | 10/2007 |

OTHER PUBLICATIONS

Handbook of fluororesins, p. 116-122, edited by Takaomi Satokawa, published by The Nikkan Kogyo Shimbun, Ltd., 1990.
U.S. Appl. No. 12/910,904, filed Oct. 25, 2010, Higuchi et al.
Extended European Search Report issued Dec. 10, 2010, in Application No. / Patent No. 09732187.1-1214 / 2267047 PCT/2009057460.

* cited by examiner

*Primary Examiner* — Terressa M Boykin

(74) *Attorney, Agent, or Firm* — Oblon, Spivak, McClelland, Maier & Neustadt, L.L.P.

(57) ABSTRACT

The present invention provides a method for producing a polytetrafluoroethylene fine powder, which comprises emulsion polymerizing tetrafluoroethylene in the presence of an aqueous medium, a fluorinated surfactant and a radical polymerization initiator to produce an aqueous polytetrafluoroethylene emulsion, mixing and coagulating the aqueous emulsion to separate a polytetrafluoroethylene fine powder, and then drying the polytetrafluoroethylene fine powder in a wet state in an atmosphere containing ammonia.

20 Claims, No Drawings

METHOD FOR PRODUCING POLYTETRAFLUOROETHYLENE FINE POWDER

BACKGROUND ART

A polytetrafluoroethylene fine powder is produced by coagulating an aqueous emulsion of polytetrafluoroethylene (hereinafter referred to as PTFE) obtained by polymerization in an aqueous medium by using an emulsifier, so called an emulsion polymerization method, to prepare a polytetrafluoroethylene fine powder (hereinafter referred to as PTFE fine powder) in a wet state, and then drying it. Since the PTFE fine powder is likely to be fiberized when shearing force is applied, it is molded by a special method, and then used for various purposes.

As one of the molding methods of the PTFE fine powder, paste extrusion molding has been employed. The paste extrusion molding is, for example, disclosed in Non-Patent Document 1. That is, to the PTFE fine powder, a lubricant such as naphtha or a petroleum hydrocarbon having a dry point of at least 100° C. is added and uniformly impregnated to obtain a mixture. Then, the mixture is preliminarily molded to a desired shape such as a tubular form to prevent fiberization of the PTFE fine powder and then charged to an extrusion cylinder and extruded by a ram for plastic deformation to obtain an extrusion molded product. Then, the extrusion molded product is heated in a drying oven to remove the lubricant by evaporation and sintered in a heating oven, whereby a desired molded material can be obtained. Otherwise, the extrusion molded product is subjected to rolling by rollers before the lubricant evaporates to obtain a sheet or a film, and then, after removal of the lubricant, the sheet or the film is subjected to stretching at a low stretching rate, to obtain an unsintered green tape. Further, by monoaxially or biaxially stretching the unsintered green tape at a high stretching rate at a high speed in a heated condition, a high strength porous film or sheet can be obtained.

Usually, with regard to the PTFE fine powder, the lower the extrusion pressure at the time of paste extrusion, the higher the productivity or yield of the product, and therefore the low extrusion pressure property is desired for the PTFE fine powder.

As a method to obtain a PTFE fine powder having a low extrusion pressure property, Patent Document 1 discloses applying radiation such as γ ray to the PTFE fine powder.

Further, as another method, a method is known wherein the drying temperature is set at a low temperature during a drying step of the PTFE fine powder in a wet state which is obtained by coagulating an aqueous PTFE emulsion after emulsion polymerization, and e.g. Patent Document 2 discloses that an extrusion pressure as low as possible can be achieved in paste extrusion molding by conducting drying at a low temperature of from about 40° C. to about 80° C.

Further, as another method, a method is known as disclosed in Patent Document 3 wherein the content of a lubricant to be used at the time of paste extrusion is increased.

Patent Document 1: JP-A-48-17546 (claims)
Patent Document 2: JP-A-52-43895 (page 8, lines 13 to 20 of the left upper column of the description)
Patent Document 3: JP-A-9-141734 (paragraph no. 0010)
Non-Patent Document 1: Handbook of fluororesins, p. 116-122, edited by Takaomi Satokawa, published by THE NIKKAN KOGYO SHIMBUN, LTD., 1990

DISCLOSURE OF THE INVENTION

Object to be Accomplished by the Invention

PTFE has had a problem such that, when it is exposed to radiation, its molecular weight decreases and e.g. mechanical property of obtainable molded article deteriorates, and then its application is limited when radiation is applied to the PTFE fine powder as disclosed in the above Patent Document 1.

Further, there has been a problem such that if the drying temperature is set at a low temperature in the drying step of the PTFE fine powder in a wet state, the water content is likely to remain in the PTFE fine powder after drying, or the productivity decreases due to the increased drying time.

Further, if the content of the lubricant to be used at the time of paste extrusion is increased, the extrusion property tends to be unstable. Further, since the amount of the lubricant to be removed from the extrusion molded product before sintering increases, removal of the lubricant by evaporation tends to be insufficient, whereby the final molded article tends to be colored. Further, since a large amount of the lubricant has to be removed so that it does not remain, there has been a problem such that the productivity significantly decreases.

On the other hand, heretofore, it has been known that properties of the obtainable PTFE fine powder are improved by adding additives such as a water-insoluble organic solvent and various pigments to the aqueous PTFE emulsion obtained by an emulsion polymerization method. However, surprisingly, a technique to improve properties of the PTFE fine powder in a PTFE fine powder drying step has been unknown.

An object of the present invention is to provide a method for producing a PTFE fine powder which can produce a PTFE fine powder having a low paste extrusion pressure property by a simple method.

Means to Accomplish the Object

The present invention provides the method for producing a PTFE fine powder having the following constructions.

[1] A method for producing a polytetrafluoroethylene fine powder, which comprises emulsion polymerizing tetrafluoroethylene in the presence of an aqueous medium, a fluorinated surfactant and a radical polymerization initiator to produce an aqueous polytetrafluoroethylene emulsion, mixing and coagulating the aqueous emulsion to separate a polytetrafluoroethylene fine powder, and then drying the polytetrafluoroethylene fine powder in a wet state in an atmosphere containing ammonia.

[2] The method for producing a polytetrafluoroethylene fine powder according to [1], wherein the polytetrafluoroethylene fine powder in a wet state is dried by heating at from 110 to 250° C. in the presence of at least one member selected from the group consisting of ammonia, an ammonium salt and urea.

[3] The method for producing a polytetrafluoroethylene fine powder according to [2], wherein the amount of the ammonia, ammonium salt or urea to be used is from 0.1 to 10 parts by mass per 100 parts by mass of the dried polytetrafluoroethylene fine powder.

[4] The method for producing a polytetrafluoroethylene fine powder according to [2] or [3], wherein the ammonium salt is ammonium carbonate.

[5] The method for producing a polytetrafluoroethylene fine powder according to any one of [1] to [4], wherein the number of carbon atoms in a fluorinated compound constituting the fluorinated surfactant is from 4 to 10.

[6] The method for producing a polytetrafluoroethylene fine powder according to any one of [1] to [5], wherein the fluorinated surfactant is at least one member selected from the group consisting of a fluorinated carboxylic acid having from 1 to 4 etheric oxygen atoms in the molecule and salts thereof, a perfluoroalkylcarboxylic acid and salts thereof, and a fluorinated sulfonic acid and salts thereof.

[7] The method for producing a polytetrafluoroethylene fine powder according to any one of [1] to [6], wherein the polytetrafluoroethylene fine powder in a wet state has a water content of from 25 to 50 mass %.

[8] The method for producing a polytetrafluoroethylene fine powder according to any one of [1] to [7], wherein the time for drying in the atmosphere containing ammonia is from 4 to 20 hours.

[9] The method for producing a polytetrafluoroethylene fine powder according to any one of [1] to [8], wherein the fluorinated surfactant is at least one member selected from the group consisting of perfluorohexanoic acid, perfluoroheptanoic acid, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3OCF_2OCF_2OCF_2COOH$, $C_4F_9OCF_2COOH$, $C_3F_7OCF_2CF_2COOH$, $CF_3OCF_2CF_2OCF_2COOH$, $C_2F_5OCF_2CF_2COOH$ and salts thereof.

[10] The method for producing a polytetrafluoroethylene fine powder according to any one of [1] to [9], wherein the fluorinated surfactant is at least one member selected from the group consisting of perfluorohexanoic acid, $C_2F_5OC_2F_4OCF_2COOH$, $CF_3OC_2F_4OCF_2COOH$, $C_4F_9OCF_2COOH$ and ammonium salts thereof.

Effects of the Invention

By the PTFE fine powder production method of the present invention, a PTFE fine powder having a low paste extrusion pressure property can be produced because the PTFE fine powder is made to have a high specific surface area by evaporation of ammonia at the time of drying the PTFE fine powder. Further, the PTFE fine powder production method of the present invention has a high productivity and does not require investment for a special facility. Further, additives are not required at the time of coagulating an aqueous PTFE emulsion, and therefore, a waste water containing a composition such as nitrogen which causes water pollution is not discharged, and the method is excellent in environmental compatibility.

BEST MODE FOR CARRYING OUT THE INVENTION

In the PTFE fine powder production method of the present invention, tetrafluoroethylene (hereinafter referred to as TFE) is firstly subjected to emulsion polymerization to produce an aqueous PTFE emulsion (hereinafter referred to as PTFE emulsion) in the presence of an aqueous medium, a fluorinated surfactant and a radical polymerization initiator.

As the aqueous medium used for production of the PTFE emulsion, water is preferred.

As the radical polymerization initiator used for production of the PTFE emulsion, a water-soluble radical initiator, a water-soluble oxidation-reduction catalyst or an oil-soluble radical polymerization initiator may, for example, be mentioned. The water-soluble radical initiator or water-soluble oxidation-reduction catalyst is preferred.

The water-soluble radical initiator is preferably a persulfate such as ammonium persulfate or potassium persulfate, or a water-soluble organic peroxide such as disuccinic acid peroxide, bisglutaric acid peroxide or tert-butyl hydroperoxide.

The water-soluble oxidation-reduction catalyst is preferably a combination of an oxidizing agent such as bromic acid or a salt thereof, chloric acid or a salt thereof, persulfuric acid or a salt thereof, permanganic acid or a salt thereof, or hydrogen peroxide, and a reducing agent such as sulfurous acid or a salt thereof, hydrogen sulfurous acid or a salt thereof, thiosulfuric acid or a salt thereof, or an organic acid.

Such radical polymerization initiators may be used alone or in combination as a mixture of two or more of them. The radical polymerization initiator is more preferably disuccinic acid peroxide. The amount of the radical polymerization initiator to be used is preferably from 0.01 to 0.20 mass %, more preferably from 0.01 to 0.15 mass %, based on the final yield of PTFE.

In emulsion polymerization of TFE, a fluorinated surfactant is usually used since it does not hinder the polymerization reaction of TFE by chain transfer in an aqueous medium.

The fluorinated surfactant to be used for the production of PTFE emulsion is preferably a $C_{4-10}$ fluorinated compound, more preferably a $C_{4-8}$ fluorinated compound, most preferably a $C_{4-7}$ fluorinated compound. When the number of carbon atoms is in the above range, the polymerization stability becomes excellent and the bioaccumulation potential becomes low.

The fluorinated surfactant is more preferably at least one member selected from the group consisting of a fluorinated carboxylic acid having from 1 to 4 etheric oxygen atoms in the molecule and salts thereof, a perfluoroalkylcarboxylic acid and salts thereof, and a fluorinated sulfonic acid and salts thereof.

The fluorinated carboxylic acid having from 1 to 4 etheric oxygen atoms in the molecule may, for example, be $C_3F_7OCF_2CF_2OCF_2COOH$, $C_4F_9OCF_2CF_2OCF_2COOH$, $C_5F_{11}OCF_2CF_2OCF_2COOH$, $C_6F_{13}OCF_2CF_2OCF_2COOH$, $CF_3O(CF_2CF_2O)_2CF_2COOH$, $C_3F_7O(CF_2CF_2O)_2CF_2COOH$, $C_4F_9O(CF_2CF_2O)_2CF_2COOH$, $C_5F_{11}O(CF_2CF_2O)_2CF_2COOH$, $C_6F_{13}O(CF_2CF_2O)_2CF_2COOH$, $C_3F_7O(CF_2CF_2O)_3CF_2COOH$, $C_4F_9O(CF_2CF_2O)_3CF_2COOH$, $C_5F_{11}O(CF_2CF_2O)_3CF_2COOH$, $C_6F_{13}O(CF_2CF_2O)_3CF_2COOH$, $C_4F_9OCF_2CF_2OCF_2CF_2OCF_2COOH$, $C_2F_5OCF_2CF_2OCF_2CF_2OCF_2COOH$, $C_3F_7OCF(CF_3)CF_2OCHFCOOH$, $CF_3OCF_2OCF_2OCF_2COOH$, $CF_3OCF_2OCF_2OCF_2OCF_2COOH$, $CF_3CF_2O(CF_2)_5 COOH$, $CF_3CFHO(CF_2)_5COOH$, $CF_3OCF(CF_3)CF_2OCF(CF_3)COOH$, $CF_3OC_3F_6OCF(CF_3)COOH$, $CF_3O(CF_2)_3 OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $CF_3CFHO(CF_2)_3COOH$, $CF_3OCF_2CF_2OCF_2COOH$, $C_2F_5OCF_2CF_2COOH$, $C_3F_7OCHFCOOH$ or $CF_3OCF_2CF_2COOH$. Further, salts of the fluorinated carboxylic acid having from 1 to 4 etheric oxygen atoms in the molecule may, for example, be Li, Na, K or $NH_4$ salts of the above compounds.

Specific examples of the perfluoroalkylcarboxylic acid may, for example, be perfluorohexanoic acid, perfluoroheptanoic acid, perfluorooctanoic acid, perfluorononanoic acid and ω-hydroperfluorooctanoic acid. Further, salts of the perfluoroalkyl carboxylic acid may, for example, be Li, Na, K or $NH_4$ salts of the above compounds.

The fluorinated sulfonic acid may, for example, be perfluorooctanoic sulfonic acid or $C_6F_{13}CH_2CH_2SO_3H$. Further, salts of the fluorinated sulfonic acid may, for example, be Li, Na, K or $NH_4$ salts of the above compounds.

As more preferred specific examples of the fluorinated surfactant, perfluorohexanoic acid, perfluoroheptanoic acid, perfluorooctanoic acid, $C_3F_7OCF_2CF_2OCF_2COOH$, $C_4F_9OCF_2CF_2OCF_2COOH$, $C_2F_5OCF_2CF_2OCF_2CF_2OCF_2COOH$, $C_3F_7OCF(CF_3)CF_2OCHFCOOH$, $CF_3OCF_2OCF_2OCF_2OCF_2COOH$, $CF_3O(CF_2CF_2O)_2CF_2COOH$, $CF_3CF_2O(CF_2)_5COOH$, $CF_3CFHO(CF_2)_5COOH$, $CF_3OCF(CF_3)CF_2OCF(CF_3)COOH$, $CF_3OCF_6OCF(CF_3)COOH$, $CF_3O(CF_2)_3OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $CF_3CFHO(CF_2)_3COOH$, $CF_3OCF_2CF_2OCF_2COOH$, $C_2F_5OCF_2CF_2COOH$, $C_3F_7OCHFCOOH$, $CF_3OCF_2CF_2COOH$ and a fluorinated sulfonic acid or salts thereof may be mentioned.

As further preferred specific examples, perfluorohexanoic acid, perfluoroheptanoic acid, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3OCF_2OCF_2OCF_2COOH$, $C_4F_9OCF_2COOH$, $C_3F_7OCF_2CF_2COOH$, $CF_3OCF_2CF_2OCF_2COOH$ and $C_2F_5OCF_2CF_2COOH$ or salts thereof may be mentioned.

As the most preferred examples, perfluorohexanoic acid, $C_2F_5OC_2F_4OCF_2COOH$, $CF_3OC_2F_4OCF_2COOH$ and $C_4F_9OCF_2COOH$ or salts thereof may be mentioned.

Further, the fluorinated surfactant is particularly preferably an ammonium salt ($NH_4$) of such a compound. The ammonium salt has good solubility in an aqueous medium and no metal iron component will remain in the PTFE fine powder as an impurity.

In the present invention, the PTFE emulsion is preferably produced by emulsion polymerization of TFE in the presence of a stabilizing agent in addition to an aqueous medium, a fluorinated surfactant and a radical polymerization initiator.

The stabilizing agent is preferably paraffin wax, a fluorine-based oil, a fluorine-based solvent or silicone oil. Such stabilizing agents may be used alone or in a combination as a mixture of two or more of them. As the stabilizing agent, paraffin wax is more preferred. Paraffin wax may be liquid, semisolid or solid at room temperature, and a saturated hydrocarbon having at least 12 carbon atoms, is preferred. The melting point of the paraffin wax is usually preferably from 40 to 65° C., more preferably from 50 to 65° C. The amount of the stabilizing agent to be used is preferably from 0.1 to 12 mass %, more preferably from 0.1 to 8 mass %, based on the mass of an aqueous medium to be used.

In the present invention, in the emulsion polymerization of TFE, a homopolymer of TFE (PTFE) may be obtained by homopolymerization of TFE. In addition, TFE may be copolymerized with another monomer which can be copolymerized with TFE (hereinafter referred to as a comonomer) to such an extent that does not provide melt-moldability, to obtain a copolymer of TFE with the comonomer (hereinafter referred to as modified PTFE). The content of constituting units based on the comonomer in the modified PTFE is preferably at most 0.5 mass %, more preferably at most 0.4 mass %, based on the total constituting units. If the content exceeds 0.5 mass %, meltability will be imparted, and the modified PTFE is likely to become unsuitable for a heat resistance use.

The above comonomer to be used for polymerization for the modified PTFE may, for example, be hexafluoropropylene, a perfluoro(alkyl vinyl ether), chlorotrifluoroethylene, a (perfluoroalkyl)ethylene, vinylidene fluoride, vinyl fluoride, a perfluoro(alkenyl vinyl ether), perfluoro(2,2-dimethyl-1,3-dioxol) or a perfluoro(4-alkoxy-1,3-dioxol). Such comonomers may be used alone or in a combination as a mixture of two or more of them.

The perfluoro(alkyl vinyl ether) may, for example, be perfluoro(methyl vinyl ether), perfluoro(ethyl vinyl ether), perfluoro(propyl vinyl ether), perfluoro(butyl vinyl ether), perfluoro(ethoxy ethyl vinyl ether), perfluoro(propoxy propyl vinyl ether) or perfluoro(tetrahydrofuryl methyl vinyl ether).

The perfluoro(alkenyl vinyl ether) may, for example, be perfluoro(allyl vinyl ether) or perfluoro(butenyl vinyl ether).

As conditions for the emulsion polymerization of TFE, the polymerization temperature is preferably from 10 to 95° C., more preferably from 15 to 90° C. The polymerization pressure is preferably from 0.5 to 4.0 MPa, more preferably from 0.6 to 3.5 MPa. The polymerization time is preferably from 90 to 520 minutes, more preferably from 90 to 450 minutes.

The PTFE emulsion obtained by emulsion polymerization of TFE has a PTFE concentration of preferably from 10 to 45 mass %, more preferably from 15 to 45 mass %, particularly preferably from 20 to 40 mass %. If the PTFE concentration is too low, it will be difficult to coagulate the primary particles of PTFE. If the PTFE concentration is too high, the non-coagulated primary particles of PTFE will remain, and the liquid from coagulation will be turbid. When the PTFE concentration is within the above range, it is easy to coagulate the primary particles of PTFE, whereby it becomes possible to make the primary particle size of PTFE to be in a range of from 0.18 to 0.50 μm. Specifically, by adjusting the PTFE concentration to from 15 to 45 mass %, it becomes easier to make the primary particle size of PTFE to be in a range of from 0.19 to 0.40 μm. Here, the primary particle size is a median size measured by a laser scattering particle size distribution analyzer.

Then, the PTFE fine powder is separated from the PTFE emulsion. As a PTFE fine powder separation method, a known method may be used. For example, the PTFE emulsion is diluted with water to adjust the PTFE concentration to from 8 to 20 mass %, followed by intense stirring to coagulate the primary particles of PTFE. When coagulating the primary particles, the pH of the aqueous PTFE emulsion may be adjusted or a coagulant such as an electrolyte or a water-soluble organic solvent may be added to the aqueous PTFE emulsion, as the case requires. As a pH adjusting agent, sodium carbonate or sodium hydrogencarbonate may be mentioned. As the electrolyte, an inorganic salt such as potassium nitrate, sodium nitrate, sodium carbonate or sodium hydrogencarbonate may, for example, be mentioned. As the organic solvent, an alcohol or acetone may be mentioned.

Further, the primary particles of PTFE are coagulated and then stirred properly to separate the PTFE fine powder having its primary particles coagulated from the aqueous medium, followed by agglomeration, particle size regulation to obtain a PTFE fine powder in a wet state. Here, in the present invention, agglomeration is a step of growing PTFE particles to several hundred μm after coagulation of an aqueous PTFE emulsion, and particle size regulation is a condition in which a particle property and a particle size distribution are regulated by continuing stirring.

Further, a fluorinated surfactant is contained in the aqueous medium after the PTFE fine powder is separated, and the fluorinated surfactant contained in the aqueous medium can be recovered by using a method of adsorbing it by an ion exchange resin, a concentrating method such as evaporation of water, or adsorption with activated carbon.

Then, the PTFE fine powder in a wet state separated from the PTFE emulsion (hereinafter referred to as undried PTFE fine powder) is dried. The present invention is characterized in that the undried PTFE fine powder is dried in an atmosphere containing ammonia.

Here, the PTFE fine powder in a wet state usually means a PTFE fine powder which contains from 25 to 50 mass % of water in the PTFE fine powder.

Further, the atmosphere containing ammonia means an atmosphere in which an ammonia gas may contact the PTFE fine powder. For example, it means an atmosphere in which an ammonia gas exists or an atmosphere in which an ammonia gas is generated by e.g. heating such a solution that ammonia or a compound generating ammonia is dissolved in water contained in the undried PTFE fine powder.

As the compound generating ammonia, an ammonium salt or urea may, for example, be mentioned, and such compounds are decomposed by heating to generate an ammonia gas.

The preferred range of the ammonia content in the drying atmosphere is determined by dividing the amount of ammonia used in the drying space or the total amount of ammonia in a compound generating ammonia by the drying space volume, and is preferably from 0.001 to 3.0 g/L, more preferably from 0.005 to 3.0 g/L and most preferably from 0.005 to 2.0 g/L.

In the present invention, from the viewpoint of handling efficiency, odor, etc., it is preferred that an aqueous solution containing ammonia, an ammonium salt or urea is added to the undried PTFE fine powder, so that when the undried PTFE fine powder is heated and dried, an ammonia gas is generated from the aqueous solution.

It is more preferred to conduct drying by heating the undried PTFE fine powder to from 110 to 250° C. in the presence of at least one member selected from the group consisting of ammonia, an ammonium salt and urea.

The ammonium salt may, for example, be ammonium carbonate or ammonium hydrogencarbonate. Ammonium carbonate is particularly preferred. The solubility of ammonium carbonate is 55.8 g/100 g water (0° C.), and is higher than the solubility of ammonium hydrogencarbonate (24.8 g/100 g water (25° C.)), whereby handling is easy when used in a form of an aqueous solution since it can be handled as a concentrated solution and its risk of precipitation by fluctuation of atmospheric temperature is low.

Further, since urea is not decomposed to ammonia unless heated to about at least 130° C., it is preferred to conduct drying in the presence of ammonia or an ammonium salt when conducting drying at a low temperature.

The amount of ammonia, an ammonium salt or urea to be used is preferably from 0.1 to 10 parts by mass per 100 parts by mass of the dried PTFE fine powder. When the amount of the ammonia, ammonium salt or urea to be used is at least 0.1 part by mass, effects of the present invention are expressed more significantly. The upper limit is preferably 10 parts by mass, since odor provision of discharged gas is required when the amount to be used is too large. The amount is more preferably from 0.1 to 7 parts by mass, most preferably from 0.1 5o 5 parts by mass.

By drying the undried PTFE fine powder in the atmosphere containing ammonia, a PTFE fine powder having a low paste extrusion pressure property is obtained. Although the reason for this is not clearly understood, it is considered that a condition of high specific surface area is imparted in the PTFE fine powder when drying is conducted in an atmosphere containing ammonia, whereby uniform distribution of the lubricant at the time of paste extrusion is promoted. Particularly, when the undried PTFE fine powder is heated and dried in a condition wherein ammonia, an ammonium salt or urea is dissolved in the aqueous medium, an ammonia gas is generated so that foaming occurs at the time of drying, whereby it becomes possible to increase a specific surface area of the PTFE fine powder. In fact, when drying is conducted in an atmosphere containing ammonia, the bulk density of the obtained PTFE fine powder is lower than the case where drying is conducted without ammonia, which is considered to support the above assumption.

On the other hand, if the ammonium salt is merely added or permitted to exist at the time of stirring and coagulating the aqueous PTFE emulsion, the obtained PTFE fine powder may become tightly packed, and the bulk density may increase, whereby it may become impossible to reduce the paste extrusion pressure. This suggests that the technique of the present invention is totally different from a conventional technique wherein an aqueous PTFE emulsion is stirred and coagulated in the presence of ammonia or an ammonium salt.

The drying temperature of the undried PTFE fine powder is preferably from 110 to 250° C., more preferably from 120 to 230° C. When the drying temperature is less than 110° C., not only the drying time becomes longer, but also removal of the water content is likely to be insufficient. When the drying temperature becomes 250° C. or higher, improvement of the paste extrusion pressure property is likely to become impossible.

The drying time is preferably from 4 to 20 hours, more preferably from 5 to 18 hours, most preferably from 5 to 15 hours. The water content is likely to remain when the drying time is shorter than 4 hours, and the productivity is likely to be affected significantly when the drying time is longer than 20 hours. When the drying time is within the above range, the residual water content and the productivity are well balanced, such being preferred.

The drying of the undried PTFE fine powder is preferably conducted in such a state that the undried PTFE fine powder will not substantially flow, preferably in a state that it will be left to stand still. At that time, it is also preferred to dry it by using vacuum, a high frequency wave, hot air or the like. Further, to carry out removal of the water content efficiently, it is preferred to use a tray by which the undried PTFE fine powder is spread to form a layer of low height. It is preferably spread so that the layer height becomes a thickness of from 1 cm to 10 cm. Specifically, considering the productivity, the layer height is more preferably from 2 cm to 10 cm, and considering drying efficiency, it is most preferably from 2 cm to 6 cm.

When the drying is conducted by using a tray and permitting ammonia, an ammonium salt or urea to coexist in a form of an aqueous solution with the undried PTFE fine powder, the aqueous solution may be introduced into the tray either before or after introduction of the undried PTFE fine powder. Considering the odor problem and the contact condition with the PTFE fine powder in a wet state, it is preferred that the above-mentioned aqueous solution is introduced into the tray before introduction of the undried PTFE fine powder.

Further, when the undried PTFE fine powder has adsorbed a fluorinated surfactant, the adsorbed fluorinated surfactant can be recovered by introducing the air discharged during the drying, to the alkali aqueous solution.

The standard specific gravity of the PTFE fine powder produced by the production method of the present invention is preferably from 2.140 to 2.180, more preferably from 2.140 to 2.170, particularly preferably from 2.140 to 2.160. The standard specific gravity is used as a relative scale of the molecular weight, and the lower the value, the higher the molecular weight. Usually, the PTFE fine powder having a large molecular weight is likely to have a high paste extrusion pressure. However, the PTFE fine powder obtained by the production method of the present invention can be molded by a low paste extrusion pressure, and therefore, the higher the molecular weight, i.e. the smaller the standard specific gravity, the higher the efficiency.

The PTFE fine powder produced by the PTFE fine powder production method of the present invention has a low paste extrusion pressure property, whereby it can be molded by a low paste extrusion pressure, and it is possible to produce a desired molded article with good productivity.

As the paste extrusion molding method of the PTFE fine powder, a known conventional method can be employed. For example, a method may be mentioned in which a lubricant is mixed with the PTFE fine powder to impart flowability to the PTFE fine powder and then paste extrusion molding is conducted to obtain a desired shape. The mixing ratio of the lubricant may be set properly to let the PTFE fine powder have flowability. It is usually from 15 to 30 parts by mass, more preferably from 20 to 25 parts by mass, per 100 parts by mass of the PTFE fine powder. As the lubricant, it is preferred to use naphtha or a petroleum hydrocarbon having a dry point of at least 100° C. Further, an additive such as a pigment for coloring or various fillers for imparting strength and electric conductivity, may be added.

The shape of the paste extrusion molded product of the PTFE fine powder may be various such as a tube-shape, a sheet-shape, a film-shape or a fiber-shape. Its applications may, for example, be tubes, wire coatings, sealing materials, porous membranes or filters. Further, the paste extrusion molded product of the PTFE fine powder may then be stretched to obtain a PTFE porous material. As the conditions for the stretching, a proper speed of e.g. 5%/second to 1,000%/second and a proper stretching rate of e.g. at least 500%, may be used. The porosity of the porous material is not particularly limited, but the porosity is usually preferably in a range of from 50 to 99%, particularly preferably from 70 to 98%. An article constituted by the porous material may be in various shapes e.g. a tube-shape, a sheet-shape, a film-shape or a fiber-shape.

EXAMPLES

Now, the present invention will be described in further detail with reference to Examples and Comparative Examples, but it should be understood that the present invention is by no means restricted thereto. Methods for measuring characteristics of the PTFE fine powder are as follows:

(A) Average primary particle size (unit: μm) of PTFE obtained by emulsion polymerization: The median size was measured by using a laser scattering particle size distribution analyzer (Trade name: "LA-920", manufactured by Horiba, Ltd.).

(B) Average particle size of PTFE fine powder (unit: μm): measured in accordance with JIS K6891. 20, 30, 40, 45 and 60 mesh standard sieves were piled in this order from the top. The powder was put on the 20 mesh sieve and sieved, and the mass of PTFE powder remained on each sieve was measured. The 50% particle size calculated by a logarithmic probability paper based on the above mass, is designated as the average particle size.

(C) Bulk density (unit: g/ml): measured in accordance with JIS K6891. Into a stainless steel weighing bottle with an inner volume of 100 mL, a sample was dropped from a funnel set above, and a part of the sample bulging from the weighing bottle was scraped off with a flat plate. Thereafter, the weight of the sample remaining in the weighing bottle was measured, and a value obtained by dividing the weight of the sample by the inner volume of the weighing bottle was taken as the apparent density.

(D) Standard specific gravity (hereinafter referred to also as "SSG"): measured in accordance with ASTM D1457-91a and D4895-91a. 12.0 g of PTFE was weighed and kept in a cylindrical die with an inner diameter of 28.6 mm under a pressure of 34.5 MPa for 2 minutes. It was put into an oven at 290° C., and the temperature was raised at a rate of 120° C./hr. It was kept at 380° C. for 30 minutes, then the temperature was lowered at a rate of 60° C./hr, and it was kept at 294° C. for 24 minutes. The molded product was kept in a desiccator at 23° C. for 12 hours. Thereafter, the specific gravity of the molded product to water at 23° C. was measured and taken as the standard specific gravity.

(E) Evaluation for extrusion pressure: 100 g of the PTFE fine powder which was left at room temperature for more than 2 hours, was put into a glass bottle having an internal capacity of 900 cc, and 21.7 g of a lubricant, Isopar H (registered trademark; manufactured by EXXON Corporation) was added, followed by mixing for 3 minutes to obtain a PTFE mixture. The obtained PTFE mixture was left in a constant temperature chamber at 25° C. for 2 hours, and then extruded through an orifice having a diameter of 2.5 cm, a land length of 1.1 cm and an introduction angle of 30°, at 25° C. under conditions of a reduction ratio (ratio of the cross-section of the inlet to the cross-section of the outlet of the die) of 100 and an extrusion ratio of 51 cm/minute, to obtain a paste extrusion bead. The pressure required for the extrusion at that time was measured, and it was designated as the extrusion pressure.

(F) Measurement of mechanical strength of PTFE compression molded product: measured in accordance with ASTM D4895-98 and D1708. 14.5 g of the PTFE fine powder was weighed and kept in a cylindrical die having an inner diameter of 76 mm under a pressure of 13.7 MPa for 3 minutes. It was put into an oven at 290° C., and the temperature was raised at a rate of 120° C./hr. It was kept at 380° C. for 30 minutes, then cooled at a rate of 60° C./hr and kept at 300° C. for 30 minutes. It was punched by a micro dumbbell cutter (MK-1229) and then subjected for testing by a jaw gap of 22.25 mm and a pulling rate of 50 mm/min. The tensile strength of the above two sheets was measured at five points, and then the average values of strength and elongation were calculated.

Example 1

Into a 100 L stainless steel autoclave equipped with a baffle plate and a stirrer, 70 g of a compound having a structural formula $C_2F_5OC_2F_4OCF_2COONH_4$ (Ammonium perfluoro-3,6-dioxaoctanoate, hereinafter referred to as APFDO), 872 g of paraffin wax and 59 liters of deionized water were charged. The air in the autoclave was replaced with nitrogen, and then the pressure was reduced, and the pressure was increased by adding TFE, and the temperature was raised to 70° C. with stirring. Then, the pressure was raised to 1.765 MPa by adding TFE, and 5.0 g of disuccinic acid peroxide (concentration: 80 mass %, the rest being water) as dissolved in 1 liter of warm water at about 70° C., was injected into the autoclave. The inner pressure decreased to 1.746 MPa in about 3 minutes.

Polymerization was proceeded by adding TFE to keep the inner pressure of the autoclave at 1.765 MPa. APFDO was dissolved in warm water, and the total of 125 g as APFDO was added during the polymerization. Further, ammonium sulfite was dissolved in water, and the total of 4 g as ammonium sulfite was added during the polymerization. The temperature was lowered to 64° C. in a halfway, and it was raised to 80° C. at the end of the polymerization. The reaction was terminated at a point where the amount of TFE added reached 23 kg, and TFE in the autoclave was released into the atmosphere. The polymerization time was 176 minutes. The obtained aqueous PTFE emulsion was cooled, and the supernatant paraffin wax was removed. The solid content concentration of the aqueous PTFE emulsion was about 26 mass %. The APFDO used was 8,333 ppm, based on the final yield of PTFE. Further, the average primary particle size was 0.28 μm. The amount of coagulated material present in the reactor were just about a trace.

The aqueous PTFE emulsion was diluted with pure water to a concentration of 10 mass %, and 7.3 kg of the diluted aqueous PTFE emulsion was charged into a 8 L coagulation vessel equipped with a stirring blade and adjusted to 20° C., followed by coagulation with 427 rpm to obtain the undried PTFE fine powder. Then, 73 g of a 20% ammonium carbonate aqueous solution was introduced into a tray of 30 cm in length×40 cm in width, and the undried PTFE fine powder was evenly placed to a layer height of from 2 to 3 cm (The amount of ammonium carbonate was 2 parts by mass per 100 parts by mass of PTFE). Then, in a high temperature forced convection oven (DRH453WA type, inner volume of 91 L, manufactured by TOYO ENGINEERING WORKS, LTD.), it was dried at 180° C. for 5 hours. The average particle size and the bulk density of the obtained PTFE fine powder were 590 μm and 0.48 g/ml, respectively. SSG was 2.150. Further, a paste extruded bead was obtained by the measuring method (E) and its extrusion pressure was found to be 16.8 MPa. Further, the tensile strength was measured by the measuring method (F), and its strength and elongation were found to be 35 MPa and 360%, respectively.

Example 2

A PTFE fine powder was produced in the same manner as in Example 1 except that the undried PTFE fine powder was placed on a tray in which 73 g of a 20% ammonium carbonate aqueous solution was introduced (the amount of ammonium carbonate was 2 parts by mass per 100 parts by mass of PTFE) and dried at 150° C. for 6.5 hours. The obtained PTFE fine powder was subjected to the measuring method (E) to obtain a paste extruded bead, and its extrusion pressure was found to be 15.1 MPa.

Example 3

A PTFE fine powder was produced in the same manner as in Example 1 except that the undried PTFE fine powder was placed on a tray in which 73 g of a 20% ammonium carbonate aqueous solution was introduced (the amount of ammonium carbonate was 2 parts by mass per 100 parts by mass of PTFE) and dried at 120° C. for 8 hours. The obtained PTFE fine powder was subjected to the measuring method (E) to obtain a paste extruded bead, and its extrusion pressure was found to be 13.7 MPa.

Example 4

A PTFE fine powder was produced in the same manner as in Example 1 except that the undried PTFE fine powder was placed on a tray in which 58.4 g of a 25% ammonia aqueous solution and 200 g of water were introduced (the amount of ammonia was 2 parts by mass per 100 parts by mass of PTFE) and dried at 180° C. for 5 hours. The average particle size and the bulk density of the obtained PTFE fine powder were 585 μm and 0.49 g/ml. respectively. SSG was 2.150. Further, a paste extruded bead was obtained by the measuring method (E), and its extrusion pressure was found to be 16.9 MPa.

Example 5

A PTFE fine powder was produced in the same manner as in Example 1 except that the undried PTFE fine powder was placed on a tray in which 73 g of a 20% urea aqueous solution was introduced (the amount of urea was 2 parts by mass per 100 parts by mass of PTFE) and dried at 180° C. for 5 hours. The average particle size and the bulk density of the obtained PTFE fine powder were 595 μm and 0.46 g/ml, respectively. Further, a paste extruded bead was obtained by the measuring method (E), and its extrusion pressure was found to be 15.2 MPa.

Example 6

A PTFE fine powder was produced in the same manner as in Example 1 except that the undried PTFE fine powder was placed on a tray in which 18.3 g of a 20% ammonium carbonate aqueous solution was introduced (the amount of ammonium carbonate was 0.5 part by mass per 100 parts by mass of PTFE) and dried at 180° C. for 5 hours. The average particle size and the bulk density of the obtained PTFE fine powder were 580 μm and 0.49 g/ml, respectively. Further, a paste extruded bead was obtained by the measuring method (E), and its extrusion pressure was found to be 17.1 MPa.

Example 7

A PTFE fine powder was produced in the same manner as in Example 1 except that the undried PTFE fine powder was placed on a tray in which 146 g of a 20% ammonium carbonate aqueous solution was introduced (the amount of ammonium carbonate was 4 parts by mass per 100 parts by mass of PTFE) and dried at 180° C. for 5 hours. The average particle size and the bulk density of the obtained PTFE fine powder were 580 μm and 0.48 g/ml, respectively. Further, a paste extruded bead was obtained by the measuring method (E), and its extrusion pressure was found to be 17.0 MPa.

Comparative Example 1

A PTFE fine powder was produced in the same manner as in Example 1 except that the undried PTFE fine powder was dried without adding ammonium carbonate. The average particle size and the bulk density of the obtained PTFE fine powder were 550 μm and 0.53 g/ml, respectively. SSG was 2.150. Further, a paste extruded bead was obtained by the measuring method (F), and its extrusion pressure was found to be 18.3 MPa. Comparing to the PTFE fine powder obtained by the method of Example 1, the extrusion pressure was higher by 1.5 MPa (9%). Then, the tensile strength was measured in accordance with the measuring method (F), and its strength was found to be 41 MPa and its elongation was found to be 410%, and it was found to have almost the same mechanical strength as the PTFE extrusion molded product which used the PTFE fine powder obtained by the method of Example 1.

Comparative Example 2

A PTFE fine powder was produced in the same manner as in Example 2 except that the undried PTFE fine powder was dried without adding ammonium carbonate. The obtained PTFE fine powder was subjected to the measuring method (E), and then a paste extruded bead was obtained. Its extrusion pressure was found to be 16.7 MPa. Comparing to the PTFE fine powder obtained by the method of Example 2, its extrusion pressure was higher by 1.6 MPa (11%).

Comparative Example 3

A PTFE fine powder was produced in the same manner as in Example 3 except that the undried PTFE fine powder was dried without adding ammonium carbonate. The obtained PTFE fine powder was subjected to the measuring method (E), and then a paste extruded bead was obtained. Its extrusion pressure was found to be 14.5 MPa. Comparing to the PTFE fine powder obtained by the method of Example 3, its extrusion pressure was higher by 0.8 MPa (6%).

Example 8

Into a 100 L stainless steel autoclave equipped with a baffle plate and a stirrer, 35 g of ammonium perfluorooctanoate (hereinafter referred to as APFO), 872 g of paraffin wax and 59 liters of deionized water were charged. The air in the autoclave was replaced with nitrogen, and then the pressure was reduced, and the pressure was increased by adding TFE and the temperature was raised to 70° C. with stirring. Then, the pressure was raised to 1.765 MPa by adding TFE, and 5.0 g of disuccinic acid peroxide (concentration: 80 mass %, the rest being water) as dissolved in 1 liter of warm water at about 70° C., was injected into the autoclave. The inner pressure decreased to 1.746 MPa in about 3 minutes.

Polymerization was proceeded by adding TFE to keep the inner pressure of the autoclave at 1.765 MPa. APFO was dissolved in warm water, and the total of 63 g as APFO was added during the polymerization. Further, ammonium sulfite was dissolved in water, and the total of 4 g as ammonium sulfite was added during the polymerization. The temperature was lowered to 64° C. in a halfway, and it was raised to 80° C. at the end of the polymerization. The reaction was terminated at a point where the amount of TFE added reached 23 kg, and TFE in the autoclave was released into the atmosphere. The polymerization time was 173 minutes. The obtained aqueous PTFE emulsion was cooled, and the supernatant paraffin wax was removed. The solid content concentration of the aqueous PTFE emulsion was about 26 mass %. The APFO used was 4,122 ppm, based on the final yield of PTFE. Further, the average primary particle size was 0.25 μm. The amount of coagulated material present in the reactor were just about a trace.

The aqueous PTFE emulsion was diluted with pure water to a concentration of 10 mass %, and 7.3 kg of the diluted aqueous PTFE emulsion was charged into a 8 L coagulation vessel equipped with a stirring blade and adjusted to 20° C., followed by coagulation with 427 rpm to obtain the undried PTFE fine powder. Then, 9.1 g of a 20% ammonium carbonate aqueous solution was introduced into a tray of 30 cm in length×40 cm in width, and the undried PTFE fine powder was evenly placed to a layer height of from 2 to 3 cm (The amount of ammonium carbonate was 0.25 parts by mass per 100 parts by mass of PTFE). Then, in a high temperature forced convection oven (DRH453WA type, inner volume of 91 L, manufactured by TOYO ENGINEERING WORKS, LTD.), it was dried at 180° C. for 5 hours. The average particle size and the bulk density of the obtained PTFE fine powder were 530 μm and 0.47 g/ml, respectively. SSG was 2.150.

Further, a paste extruded bead was obtained by the measuring method (E), and its extrusion pressure was found to be 16.3 MPa.

Example 9

A PTFE fine powder was produced in the same manner as in Example 8 except that the undried PTFE fine powder was placed on a tray in which 146 g of a 20% ammonium carbonate aqueous solution was introduced (the amount of ammonium carbonate was 4 parts by mass per 100 parts by mass of PTFE) and dried at 180° C. for 5 hours. The average particle size and the bulk density of the obtained PTFE fine powder were 510 μm and 0.47 g/ml, respectively. Further, a paste extruded bead was obtained by the measuring method (E), and its extrusion pressure was found to be 16.0 MPa.

Comparative Example 4

A PTFE fine powder was produced in the same manner as in Example 8 except that the undried PTFE fine powder was dried without adding ammonium carbonate. The average particle size and the bulk density of the obtained PTFE fine powder were 440 μm and 0.50 g/ml, respectively. SSG was 2.150. Further, a paste extruded bead was obtained by the measuring method (F), and its extrusion pressure was found to be 18.1 MPa. Comparing to the PTFE fine powder obtained by the method of Example 8, the extrusion pressure was higher by 1.8 MPa (11%). Further, comparing to the PTFE fine powder obtained by the method of Example 9, the extrusion pressure was higher by 2.1 MPa (13%).

Comparative Example 5

The aqueous PTFE emulsion obtained by Example 1 was diluted with pure water to a concentration of 10 mass %, and 7.3 kg of the diluted aqueous PTFE emulsion was charged into a 8 L size coagulation vessel equipped with a stirring blade and adjusted to 20° C. Then, 146 g of ammonium carbonate (20 parts by mass per 100 parts by mass of PTFE) was introduced and coagulated with 427 rpm to obtain a PTFE fine powder. Then, the PTFE fine powder was dried at 180° C. for 5 hours. The average particle size and the bulk density were found to be 340 μm and 0.53 g/ml, respectively. Further, a paste extruded bead was obtained by the measuring method (E). The extrusion pressure was found to be 18.3 MPa.

TABLE 1

| | Ex. 1 | Ex. 2 | Ex. 3 | Ex. 4 | Ex. 5 | Ex. 6 | Ex. 7 |
|---|---|---|---|---|---|---|---|
| Fluorinated surfactant | APFDO | APFDO | APFDO | APFDO | APFDO | APFDO | APFDO |
| Ammonium carbonate (parts/PTFE) | 2 | 2 | 2 | — | — | 0.5 | 4 |
| Ammonia water (25%) (parts/PTFE) | — | — | — | 8 | — | — | — |
| Urea (parts/PTFE) | — | — | — | — | 2 | — | — |
| Drying temperature (° C.) | 180 | 150 | 120 | 180 | 180 | 180 | 180 |

TABLE 1-continued

|  |  |  |  |  |  |  |  |
|---|---|---|---|---|---|---|---|
| Drying time (hr) | 5 | 6.5 | 8 | 5 | 5 | 5 | 5 |
| Average particle size (μm) | 590 | — | — | 585 | 595 | 580 | 580 |
| Bulk density (g/ml) | 0.48 | — | — | 0.49 | 0.46 | 0.49 | 0.48 |
| Extrusion pressure (MPa) | 16.8 | 15.1 | 13.7 | 16.9 | 15.2 | 17.1 | 17.0 |
| SSG | 2.150 | — | — | 2.150 | — | — | — |
| Strength (MPa) | 35 | — | — | — | — | — | — |
| Elongation (%) | 360 | — | — | — | — | — | — |

|  | Comp. Ex. 1 | Comp. Ex. 2 | Comp. Ex. 3 | Ex. 8 | Ex. 9 | Comp. Ex. 4 | Comp. Ex. 5 |
|---|---|---|---|---|---|---|---|
| Fluorinated surfactant | APFDO | APFDO | APFDO | APFO | APFO | APFO | APFDO |
| Ammonium carbonate (parts/PTFE) | 0 | 0 | 0 | 0.25 | 4 | 0 | 20* |
| Ammonia water (25%) (parts/PTFE) | — | — | — | — | — | — | — |
| Urea (parts/PTFE) | — | — | — | — | — | — | — |
| Drying temperature (° C.) | 180 | 150 | 120 | 180 | 180 | 180 | 180 |
| Drying time (hr) | 5 | 6.5 | 8 | 5 | 5 | 5 | 5 |
| Average particle size (μm) | 550 | — | — | 530 | 510 | 440 | 340 |
| Bulk density (g/ml) | 0.53 | — | — | 0.47 | 0.47 | 0.50 | 0.53 |
| Extrusion pressure (MPa) | 18.3 | 16.7 | 14.5 | 16.3 | 16.0 | 18.1 | 18.3 |
| SSG | 2.150 | — | — | 2.150 | — | 2.150 | — |
| Strength (MPa) | 41 | — | — | — | — | — | — |
| Elongation (%) | 410 | — | — | — | — | — | — |

*Used at the time of coagulation of the PTFE fine powder

INDUSTRIAL APPLICABILITY

Since the PTFE fine powder produced by the production method of the present invention has a low paste extrusion pressure property, it is suitable for production of tubes having wide width and various bore diameters, green tapes, porous films and sheets.

Further, it is also preferably used for bearing materials in which pigments and fillers are blended to improve various properties of molded articles and sealing materials.

The entire disclosure of Japanese Patent Application No. 2008-104307 filed on Apr. 14, 2008 including specification, claims and summary is incorporated herein by reference in its entirety.

What is claimed is:

1. A method for producing a polytetrafluoroethylene fine powder, which comprises
   emulsion polymerizing tetrafluoroethylene in the presence of an aqueous medium, a fluorinated surfactant and a radical polymerization initiator to produce an aqueous polytetrafluoroethylene emulsion,
   mixing and coagulating the aqueous emulsion to separate a polytetrafluoroethylene fine powder, and then
   drying the polytetrafluoroethylene fine powder in a wet state in an atmosphere containing ammonia by heating at from 110 to 250° C., wherein the amount of the ammonia is from 0.1 to 10 parts by mass per 100 parts by mass of the dried polytetrafluoroethylene fine powder.

2. The method for producing a polytetrafluoroethylene fine powder according to claim 1, wherein the polytetrafluoroethylene fine powder in a wet state is dried in the presence of at least one member selected from the group consisting of ammonia, an ammonium salt and urea.

3. The method for producing a polytetrafluoroethylene fine powder according to claim 2, wherein the amount of the ammonia, ammonium salt or urea to be used is from 0.1 to 10 parts by mass per 100 parts by mass of the dried polytetrafluoroethylene fine powder.

4. The method for producing a polytetrafluoroethylene fine powder according to claim 2, wherein the ammonium salt is ammonium carbonate.

5. The method for producing a polytetrafluoroethylene fine powder according to claim 1, wherein the number of carbon atoms in a fluorinated compound constituting the fluorinated surfactant is from 4 to 10.

6. The method for producing a polytetrafluoroethylene fine powder according to claim 1, wherein the fluorinated surfactant is at least one member selected from the group consisting of a fluorinated carboxylic acid having from 1 to 4 etheric oxygen atoms in the molecule and salts thereof, a perfluoroalkylcarboxylic acid and salts thereof, and a fluorinated sulfonic acid and salts thereof.

7. The method for producing a polytetrafluoroethylene fine powder according to claim 1, wherein the polytetrafluoroethylene fine powder in a wet state has a water content of from 25 to 50 mass%.

8. The method for producing a polytetrafluoroethylene fine powder according to claim 1, wherein the time for drying in the atmosphere containing ammonia is from 4 to 20 hours.

9. The method for producing a polytetrafluoroethylene line powder according to claim 1, wherein the fluorinated surfactant is at least one member selected from the group consisting of perfluorohexanoic acid, perfluoroheptanoic acid, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3OCF_2OCF_2OCF_2COOH$, $C_4F_9OCF_2COOH$, $C_3F_7OCF_2CF_2COOH$, $CF_3OCF_2CF_2OCF_2COOH$, $C_2F_5OCF_2CF_2COOH$ and salts thereof.

10. The method for producing a polytetrafluoroethylene fine powder according to claim 1, wherein the fluorinated surfactant is at least one member selected from the group consisting of perfluorohexanoic acid, $C_2F_5OC_2F_4OCF_2COOH$, $CF_3OC_2F_4OCF_2COOH$, $C_4F_9OCF_2COOH$ and ammonium salts thereof.

11. The method for producing a polytetrafluoroethylene fine powder according to claim 1, wherein the polytetrafluoroethylene fine powder in a wet state is dried in the presence of ammonia.

12. The method for producing a polytetrafluoroethylene fine powder according to claim 1, wherein the polytetrafluoroethylene fine powder in a wet state is dried in the presence of an ammonium salt.

13. The method for producing a polytetrafluoroethylene fine powder according to claim 1, wherein the polytetrafluoroethylene fine powder in a wet state is dried in the presence of urea.

14. The method for producing a polytetrafluoroethylene fine powder according to claim 1, wherein the polytetrafluoroethylene fine powder in a wet state is dried in the presence of an ammonium salt, and the ammonium salt is ammonium carbonate.

15. The method for producing a polytetrafluoroethylene fine powder according to claim 1, wherein the polytetrafluoroethylene fine powder in a wet state is dried in the presence of ammonia, and the concentration of ammonia is 0.001 to 3.0 g/L.

16. The method for producing a polytetrafluoroethylene fine powder according to claim 1, wherein the amount of the ammonia is from 0.1 to 7 parts by mass per 100 parts by mass of the dried polytetrafluoroethylene fine powder.

17. The method for producing a polytetrafluoroethylene fine powder according to claim 1, wherein the amount of the ammonia is from 0.1 to 5 parts by mass per 100 parts by mass of the dried polytetrafluoroethylene fine powder.

18. The method for producing a polytetrafluoroethylene fine powder according to claim 1, wherein the heating is conducted at 120 to 230° C.

19. The method for producing a polytetrafluoroethylene fine powder according to claim 1, wherein the dried polytetrafluoroethylene fine powder has a standard specific gravity of 2.140 to 2.180.

20. The method for producing a polytetrafluoroethylene fine powder according to claim 1, wherein the dried polytetrafluoroethylene fine powder has a standard specific gravity of 2.140 to 2.170.

* * * * *